(12) United States Patent
Haffner (10) Patent No.: US 7,664,713 B1
(45) Date of Patent: Feb. 16, 2010

(54) METHOD AND APPARATUS FOR PROVIDING FAST KERNEL LEARNING ON SPARSE DATA

(75) Inventor: Patrick Haffner, Atlantic Highlands, NJ (US)

(73) Assignee: AT&T Corp., New York, NY (US)

( * ) Notice: Subject to any disclaimer, the term of this patent is extended or adjusted under 35 U.S.C. 154(b) by 423 days.

(21) Appl. No.: 11/618,882

(22) Filed: Dec. 31, 2006

(51) Int. Cl.
*G06F 15/18* (2006.01)
*G06N 5/02* (2006.01)

(52) U.S. Cl. .......................................... 706/12; 706/48
(58) Field of Classification Search ............... 706/12, 706/14, 45–48
See application file for complete search history.

(56) References Cited

U.S. PATENT DOCUMENTS 7,376,641 B2 * 5/2008 Chang et al. ................. 707/3

OTHER PUBLICATIONS

Lovell,B.C. et al. "Support Vector Machines for Business Applications" 2005.*
Goharian,N. et al. "On the Enhancements of a Sparse Matrix Information Retrieval Approach". PDPTO'2000. 2000.*
Namburu,S.M. et al. "Experiments on Supervised Learning Algorithms for Text Categorization" 2005 IEEE Aerospace Conference. Mar. 5-12, 2005.*
Santoro,N. et al. "An Improved Algorithm for Boolean Matrix Multiplication" Computing. Springer-Verlag. 1986.*
Kudo,T. et al. "Fast Methods for Kernel-based Text Analysis" Proceedings of the 41st Annual Meeting of the Association for Computational Linguistics, Jul. 2003.*
Goharian,N. et al. "Comparative Analysis of Sparse Matrix Algorithms for Information Retrieval" Journal of Systemics, Cybernetics and Informatics, vol. 1, No. 1. 2003.*
Haffner,P. "Fast Transpose Methods for Kernel Learning on Sparse Data" Proceedings of the 23rd International Conference on Machine Learning. Jun. 25-29, 2006.*
Toledo,S. "Improving teh memory-system performance of sparse-matrix vector multiplication" IBM Journal of Research and Development. 1997.*

* cited by examiner

*Primary Examiner*—David R Vincent
*Assistant Examiner*—Benjamin Buss (57) ABSTRACT

A method and apparatus based on transposition to speed up learning computations on sparse data are disclosed. For example, the method receives an support vector comprising at least one feature represented by one non-zero entry. The method then identifies at least one column within a matrix with non-zero entries, wherein the at least one column is identified in accordance with the at least one feature of the support vector. The method then performs kernel computations using successive list merging on the at least one identified column of the matrix and the support vector to derive a result vector, wherein the result vector is used in a data learning function.

16 Claims, 7 Drawing Sheets

```
TsMxV(M, X)
    y=0;
    for (i=0; i<|x|; i++) do
        y = TADD(y, M[.][x[i].idx], x[i].val);
    return y TADD(v1, v2, 2)
    for (j=0; j<|v2|; j++) do
        v1[v2[j].idx] += w * v2[j].val;
    return v1
```

```
VEC2LIST(y)
  y'=0;
  pos = 0;
  for (i=0; i<N_r; i++) do
    if (y[i] != 0) then
      y'[pos].idx = I;
      y'[pos].val = y[i];
      pos++;
  return y'
```

```
TMRG(v1,v2,w)
j1=0; j2=0, j=0;
y1=0;
while (j1 < |v1| and j2 < |v2|) do
    idx=v1[j1].idx;
    idx=v2[j2].idx;
    if (idx1 == idx1) then
        y1[j] = v1[j1].val + w * v2[j2].val;
        j++, j1++, j2++;
    else if (j1 > j2) then
        y1[j] = w * v2[j2].val
        j++, j2++;
    else
        y1[j] = v1[j1].val;
        j++, j1++;
Return y1
```

420 — (first if branch)
430 — (else if branch)
440 — (else branch)
410 — (while loop)

METHOD AND APPARATUS FOR PROVIDING FAST KERNEL LEARNING ON SPARSE DATA

The present invention relates generally to Machine Learning (ML) and Information Retrieval (IR) and, more particularly, to a method for providing fast kernel learning on sparse data, e.g., Support Vector Machine (SVM) learning.

BACKGROUND OF THE INVENTION

Kernel-based methods such as Support Vector Machines (SVM) represent the state-of-the-art in classification techniques. Support Vector Machines are a set of related supervised learning methods used for data classification. However, their application is limited by the scaling behavior of their training algorithm which, in most cases, scales quadratically with the number of training examples. When dealing with very large datasets, a key issue in SVM learning is to find examples which are critical for defining the separation between two classification classes quickly and efficiently. Traditional SVM often relies on sequential optimization where only a few examples are added in each computation iteration and requires performing dot-products over sparse feature vectors. In most iterative algorithms, the kernel computation can be folded into a matrix-vector multiplication; however, these types of algorithms are extremely inefficient when dealing with sparse data. An m by n matrix M is a 2-dimensional array of numbers or abstract quantities with m rows and n columns. A vector is simply an m by 1 or a 1 by n matrix. A dot-product, also known as the scalar product, is a binary operation which takes two vectors over the real numbers R and returns a real-valued scalar quantity. In Machine Learning (ML), the kernel trick is a method for easily converting a linear classifier algorithm into a non-linear one, by mapping the original observations into a higher-dimensional non-linear space so that linear classification in the new space is equivalent to non-linear classification in the original space.

Therefore, a need exists for a method for providing fast kernel learning on sparse data in kernel based learning.

SUMMARY OF THE INVENTION

In one embodiment, the present invention enables a method based on transposition to speed up learning computations on sparse data. For example, the method receives an support vector comprising at least one feature represented by one non-zero entry. The method then identifies at least one column within a matrix with non-zero entries, wherein the at least one column is identified in accordance with the at least one feature of the support vector. The method then performs kernel computations using successive list merging on the at least one identified column of the matrix and the support vector to derive a result vector, wherein the result vector is used in a data learning function.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Machine learning algorithms often comprise of sequential procedures where a new example is added and the score of all training examples is modified accordingly. In particular, kernel based algorithms rely on the computation of kernels between pairs of examples to solve classification or clustering problems. Most of them require an iterative learning procedure.

The kernel classifier is represented as a list of support vectors $x_k$ and their respective multipliers $\alpha_k$ (in the classification case, the label $y_k \in \{-1, 1\}$ gives the sign of $\alpha_k$). The classifier score for vector x is $f(x)=\Sigma_k \alpha_k K(x,x_k)$. Each iteration comprises of addition or modification of one or more support vectors. At each iteration, it is desirable to find the best candidate support vector to add or update. For that purpose, it is necessary to keep an update of the scores of all training examples or a large subset of these training examples (called the active set). When adding factor $\delta\alpha_k$ to the multiplier $\alpha_k$ of support vector $x_k$, these scores must be incremented as follows:

$$\forall i; f(x_i) = f(x_i) + \delta\alpha_k K(x_i, x_k) \qquad \text{Eq. 1}$$

For each modification of a support vector multiplier, the main required computation is the kernels $K(x, x_k)$ between the support vector $x_k$ and each vector of the active set.

Given the algorithm, one usually attempts to optimize the computation of each kernel individually. This focus on the optimization of a single kernel does not take into account the fact that entire line of kernels must be computed at the same time. However, in the case of very sparse data, a very different speedup strategy may be needed. Take a sequential optimization algorithm which adds a single training vector to the set of support vectors: one must look for the vectors in the training set whose score need to be updated after this addition. Only vectors which share features with the added support vector need to have their score updated, and their proportion can be small if the data is extremely sparse.

This indicates that, in this case, the most time consuming part of the learning process is to retrieve the small proportion of training vectors which have features in common with the added support vector, and, as in information retrieval, the concept of inverted index can be useful.

For instance, suppose that our new support vector corresponds to the sentence "I want to check my bill", and that we reduced it to a vector with 3 active features ("want", "check", "bill"), ignoring function words such as "I", "to" and "my". The inverted index approach would retrieve the list of vectors including these three words and merge them. Thus, rather than computing the kernels with every possible example, one would rather focus on examples which contain "want", "check" and "bill".

To formalize this intuition, it is convenient to define a matrix multiplication framework, which is presented in the subsequent paragraphs.

The kernel can often be expressed as a function of the dot-product $K(x_i, x_2)=\phi(\langle x_1, x_2\rangle)$. This includes most major vector kernels such as polynomial, Gaussian and Sigmoid kernels. For instance, in the Polynomial case, $\phi(t)=(at+b)^p$. The Gaussian kernel can be written as:

$$K(x_1, x_2) = \exp - \frac{1}{\sigma^2}(\|x_1\| + \|x_2\| - 2\langle x_1, x_2\rangle) \quad \text{Eq. 2}$$

where the norms $\|x_1\|$ and $\|x_2\|$ are computed in advance.

In summary, for a large class of vectorial kernels, one must compute, for each vector $x_i$ in the active set, the dot-product $y_i=\langle x_i, x_k\rangle$. By defining the matrix M with rows $M_i=x_i$, we obtain the matrix-vector multiplication $y=Mx_k$. As shown in the following table 1, the notation in the rest of this document has both a "matrix multiplication" and "SVM training" interpretation and departs from the traditional SVM notation.

TABLE 1

| Symbol | Type | Matrix | SVM Training |
| --- | --- | --- | --- |
| $N_r$ | Number | rows | Train samples |
| $N_c$ | Number | columns | Total features |
| x | Vector | multiplicand | Input |
| y | Vector | product | Dot-product |

Figure 1:
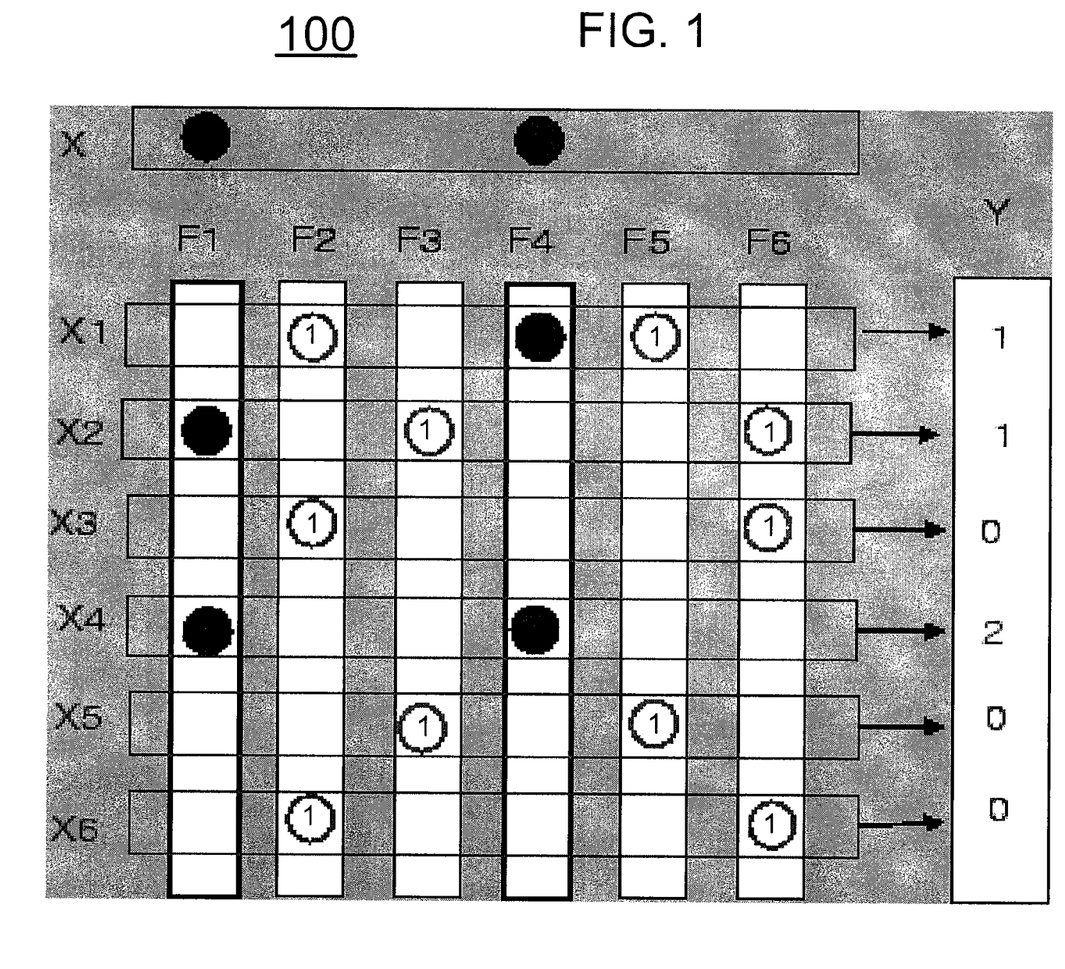
FIG. 1 illustrates a matrix vector multiplication example related to the present invention.

FIG. 1 illustrates a matrix vector multiplication example 100 related to the present invention. As shown in FIG. 1, the example matrix M has six (6) rows corresponding to active set vectors {X1, ..., X6} and six (6) columns corresponding to features {F1, ..., F6}. For illustrative purposes, all non-zero matrix or vector elements have values of 1 and are represented by either an outlined or a solid circle. The result Y of the matrix-vector multiplication of X and $X_i$ appears in the right column, where each element is a dot-product that counts the number of circles shared by X and $X_i$. Solid circles represent features in matrix M, comprising of rows X1 through X6, that have non-zero contributions to the dot-product results and outlined circles represent features in matrix M that have zero contributions to the dot-product results. A standard dot-product will have to access every non-zero feature in each vector, a total of 14 feature instances represented by 10 outlined circles and 4 solid circles, even when features F2, F3, F5, and F6 are not present in the support vector X and when the product produces zero contribution to the result. Therefore, traditional kernel methods requires dot-product computations over non-overlapping features, represented by the 10 outlined circles, even though these computations do not have any contributions to the final dot-product results. In other words, 10 out of the 14 dot-product related computations are unnecessarily performed in traditional methods. Therefore, a need exists for a method for providing fast kernel learning with sparse data in kernel based learning.

In one embodiment, the present invention enables a method based on transposition to speed up SVM learning computations on sparse data. Data is considered sparse when the number of active or non-zero features in a training vector is much lower than the total number of features. Instead of performing dot-products over sparse feature vectors, the present invention enables SVM learning computations to incrementally merge lists of training examples to minimize access to the sparse data, and hence providing dramatic speedup in SVM learning computations when compared to traditional kernel learning methods on sparse data.

Referring back to FIG. 1 to further illustrate the present invention, the transpose approach of the present invention only considers columns F1 and F4: the 6 dot products in column Y are obtained by merging the lists represented by columns F1 and F4. The total number of operations is only proportional to the number of solid circles in these columns. When compared to the traditional dot-product algorithm that has to access every single circle to perform a total of 14 dot-product related computations, the present inventions only performs 4 dot-product computations to obtain the same dot-product results as shown in column Y.

The transpose, or the inverted index, approach to matrix-vector multiplication is the following. FIG. 1 shows that only the columns of the matrix M that correspond to components that are non-zero in X contribute to the result Y and suggests an algorithm whose complexity would be a function of |X| where |X| is the number of non-zero components in vector X. A transpose representation of the matrix, where columns are accessed first, is therefore required.

Instead of going through each row $M_i$, the procedure goes through each column $M_{.j}$. Instead of computing each component of Y=MX separately, successive refinements of Y are computed iteratively over the columns of M that correspond to non-zero values of X.

Figure 2:
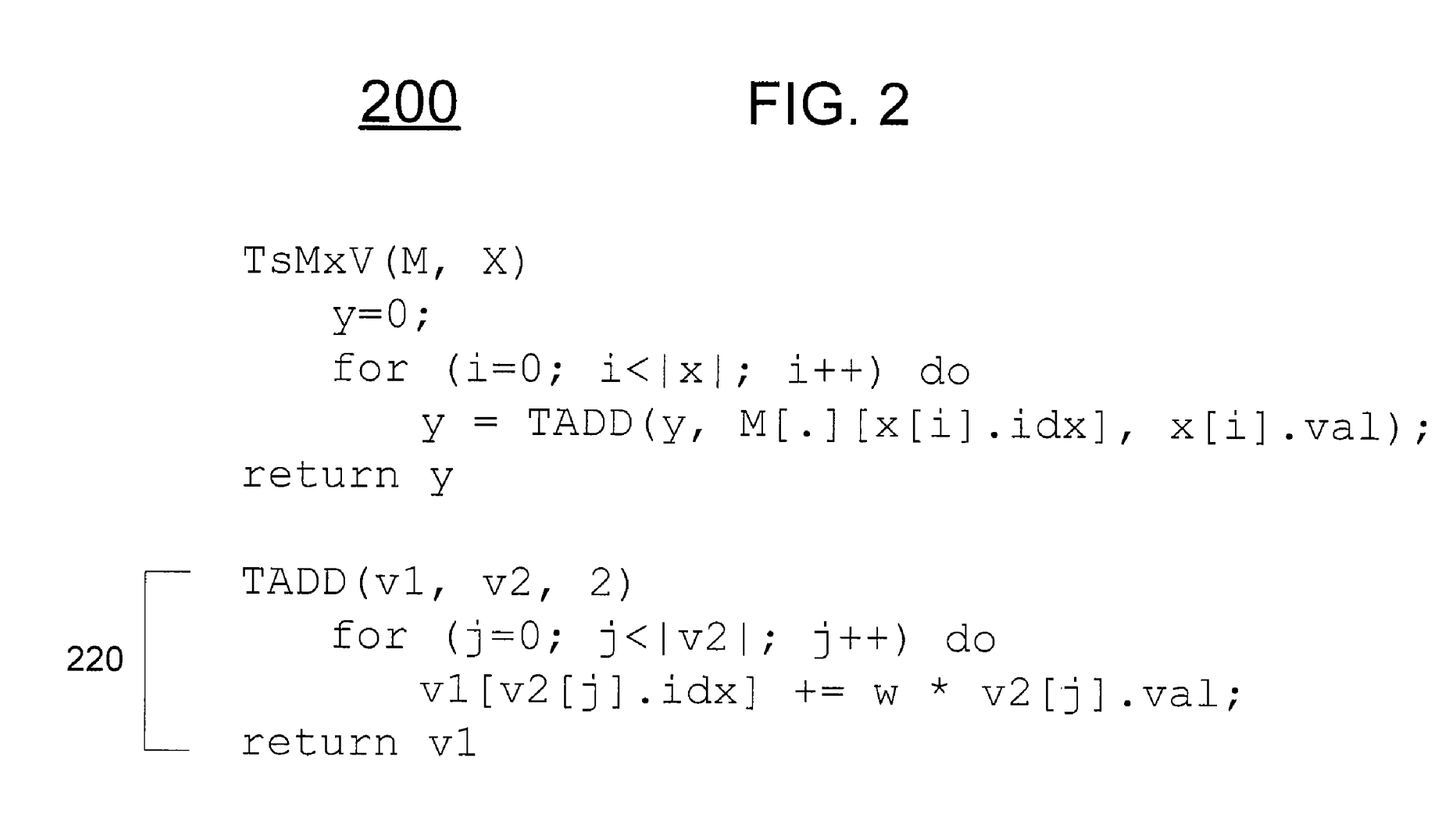
FIG. 2 illustrates a pseudo code of a transpose matrix-vector multiplication function that represents the transpose computation method related to the present invention.

FIG. 2 illustrates a pseudo code of a transpose matrix-vector multiplication function 200 that represents the transpose computation method related to the present invention. The transpose sparse matrix vector multiplication algorithm relies on function TADD, pseudo code section 220 as shown in FIG. 2, that performs a component-wise addition between $v_1=Y$ and $v_2=M_{.j}$ weighted by $w=x_j$.

Figure 3:
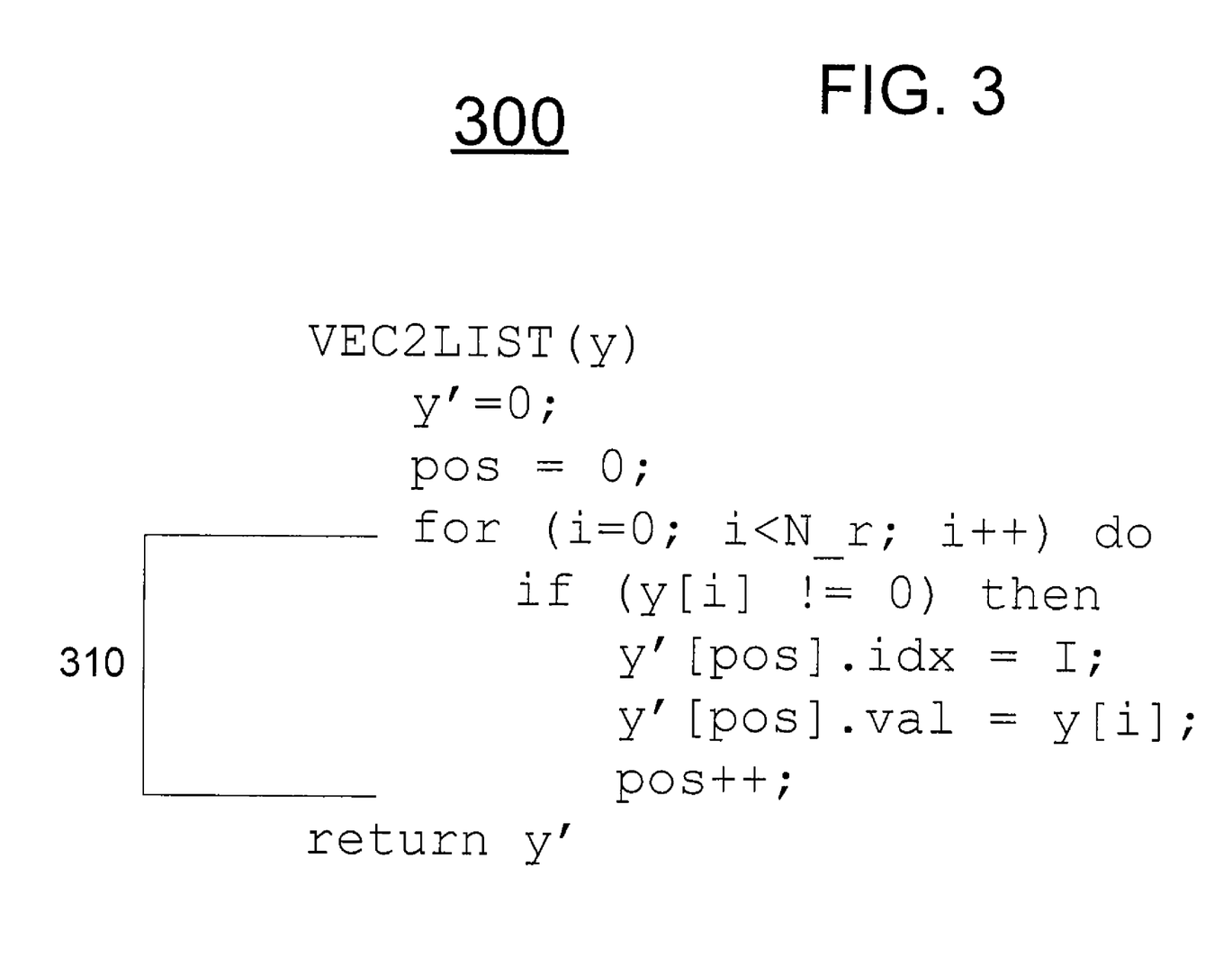
FIG. 3 illustrates a pseudo code of a vector to index-value transformation function related to the present invention.

The transpose algorithm presented produces a dense Y vector as a result. As to be shown later, a list of (index, value) pairs (e.g., broadly a list format) will be much more efficient for further processing. FIG. 3 illustrates a pseudo code of a vector to index-value transformation function 300 related to the present invention. To obtain this list, the transformation described in the algorithm VEC2LIST as shown in FIG. 3 is required. The operation, as shown in pseudo code section 310 in FIG. 3, is simply to access each Y element, and must be performed $N_T$ times, where $N_r$ is the number of elements in Y.

In order to avoid any transformation from dense vectors to (index, value) lists, the TADD function shown in FIG. 2 can be modified to exploit sparsity by also encoding the Y vector as an (index, value) list.

Figure 4:
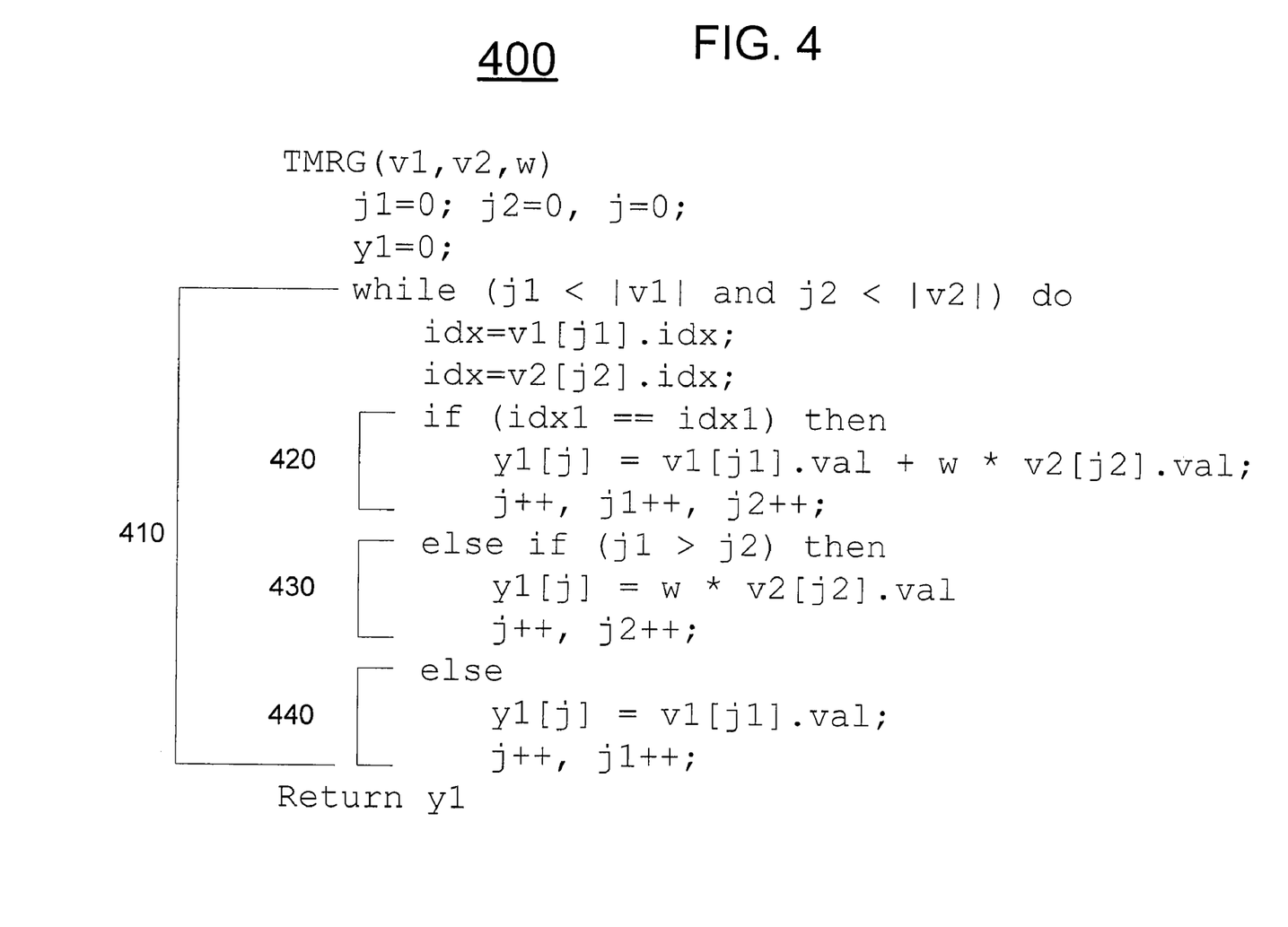
FIG. 4 illustrates a pseudo code of a sparse list merging function related to the present invention.

FIG. 4 illustrates a pseudo code of a sparse list merging function 400 related to the present invention. Initially, Y' is an empty list, and an incremental process merges Y' with the list $M_{.j}$. During each iteration of computations, Y' is appropriately updated during each pass of the while loop as shown in pseudo code section 410 in FIG. 4. When the while loop terminates, the updated vector Y' produced in the computations so far will be used as the initial vector for the next iteration of merging. Note also that the very first initial vector used for the computations of the dot-product result is simply the encoded vector of the first non-zero feature column in M.

The TMRG function shown in FIG. 4 becomes the merging of two sorted lists with addition of the values when the same index is found in both lists. This corresponds to pseudo section 420 shown in FIG. 4.

When an index is found in Y' that does not match any index in the next non-zero feature column $M_{.j}$, where column j is the next non-zero feature column in matrix M that needs to be merged, the TMRG function shown in FIG. 4 simply copies the (index, value) pair corresponding to that index to the merged list Y'. This corresponds to pseudo section 440 shown in FIG. 4.

When an index is found in the next non-zero feature column $M._{.j}$ where j is the next non-zero feature column in matrix M that needs to be merged, that does not match any index in the initial vector list Y', the TMRG function shown in FIG. 4 performs a multiplication computation between the value corresponding to the index and its associated weight and updates the result vector Y' with the multiplication computation result. This corresponds to pseudo section 430 shown in FIG. 4.

Function TMRG has the same number of multiplication and addition operations, corresponding to pseudo code section 420 and 430 as shown in FIG. 4, as function TADD but it also requires copy operations, corresponding to pseudo code section 440 as shown in FIG. 4, as well.

Figure 5:
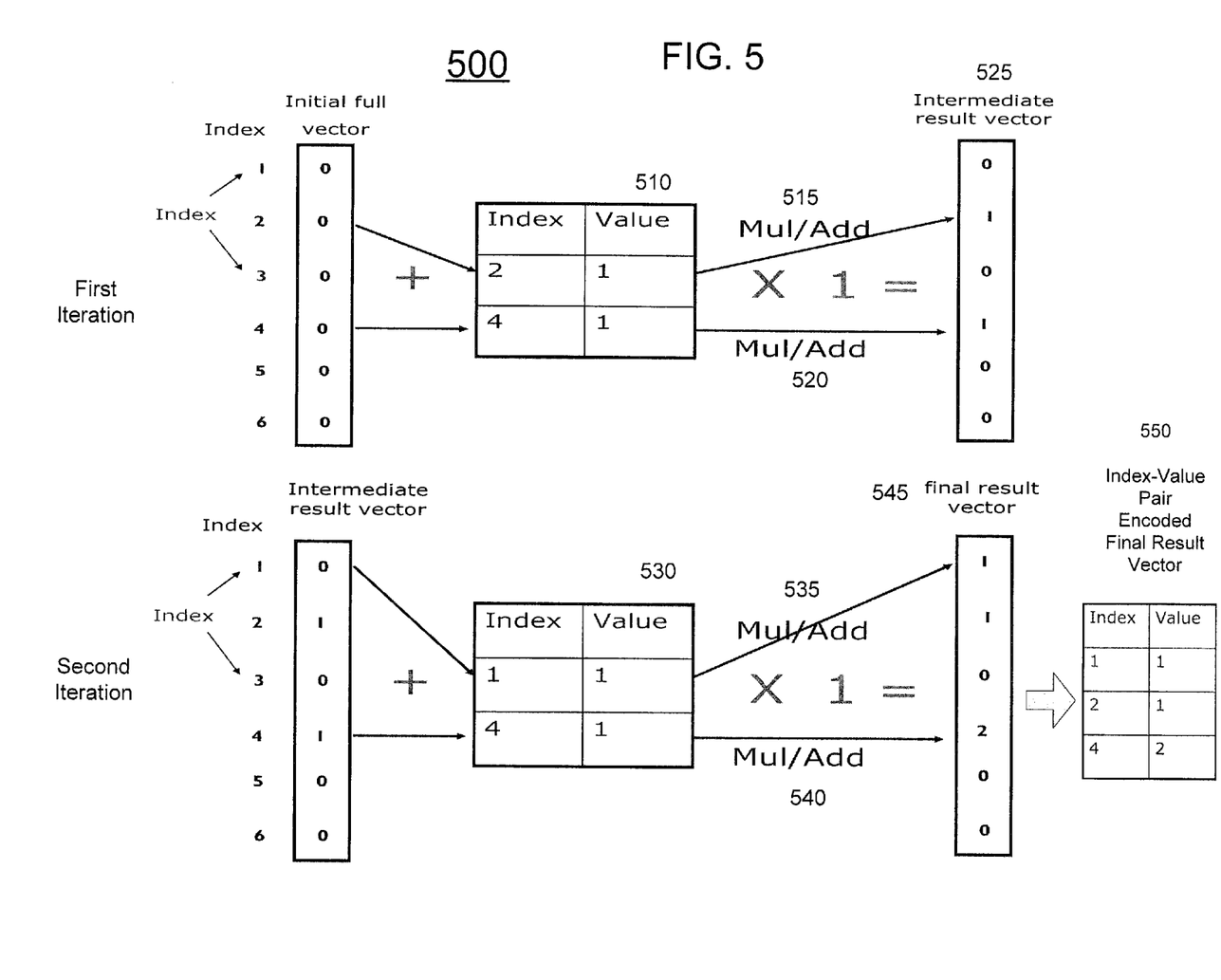
FIG. 5 illustrates a transpose matrix-vector multiplication example of the present invention.

To further illustrate the transpose matrix-vector function 200 computation example using matrix, M, and support vector, X, shown in FIG. 1, FIG. 5 illustrates a transpose matrix-vector multiplication example or method 500 using function 200 of the present invention. Note that X only contains feature F1 and F4 with corresponding columns 1 and 4 in M and the initial result vector Y is initialized to zero. Note also that the non-zero entries in X all have values of one; hence, all non-zero weightings used in the dot-product computations are ones. In example 500, during the first iteration of the computation, the initial full result vector is initialized to all zero. The first column of matrix M representing feature F1 is encoded using (index, value) pairs as shown in list 510.

In step 515, function 200 performs a multiplication and add operation between the second entry in the initial full vector Y and the corresponding first entry of the (index, value) pair list 510 to produce a resulting value of 1 in index position 2 of the updated result vector Y.

In step 520, function 200 performs a multiplication and add operation between the fourth entry in the initial full vector Y and the corresponding second entry of the (index, value) pair list 510 to produce a resulting value of 1 in index position 4 of the updated result vector Y. This completes the first iteration of the TADD function corresponding to pseudo code section 220 as shown in FIG. 2.

Then, the updated result vector Y produced in the previous iteration of the computations will now be used as the initial full vector for the current iteration of the computations. In other words, the updated result vector 525 is used as the initial full result vector for the next iteration of the computation. The fourth column of matrix M representing feature F4 is encoded using (index, value) pairs as shown in list 530.

In step 535, function 200 performs a multiplication and add operation between the first entry in the initial full result vector Y and the corresponding first entry of the (index, value) pair list 530 to produce a resulting value of 1 in index position 1 of the updated result vector Y.

In step 540, function 200 performs a multiplication and add operation between the fourth entry in the initial full result vector Y and the corresponding second entry of the (index, value) pair list 530 to produce a resulting value of 2 in index position 4 of the updated result vector Y. This completes the second or final iteration of the TADD function corresponding to pseudo code section 220 as shown in FIG. 2 and the latest updated result vector Y is the final result vector. At this point, the computation of the final result vector 545 has been computed. In addition, the final result vector 545 can be further encoded as (index-value) pair format as shown in list 550 in FIG. 5 using function 300 as shown in FIG. 3 to facilitate more efficient storage and processing of the final result vector.

Figure 6:
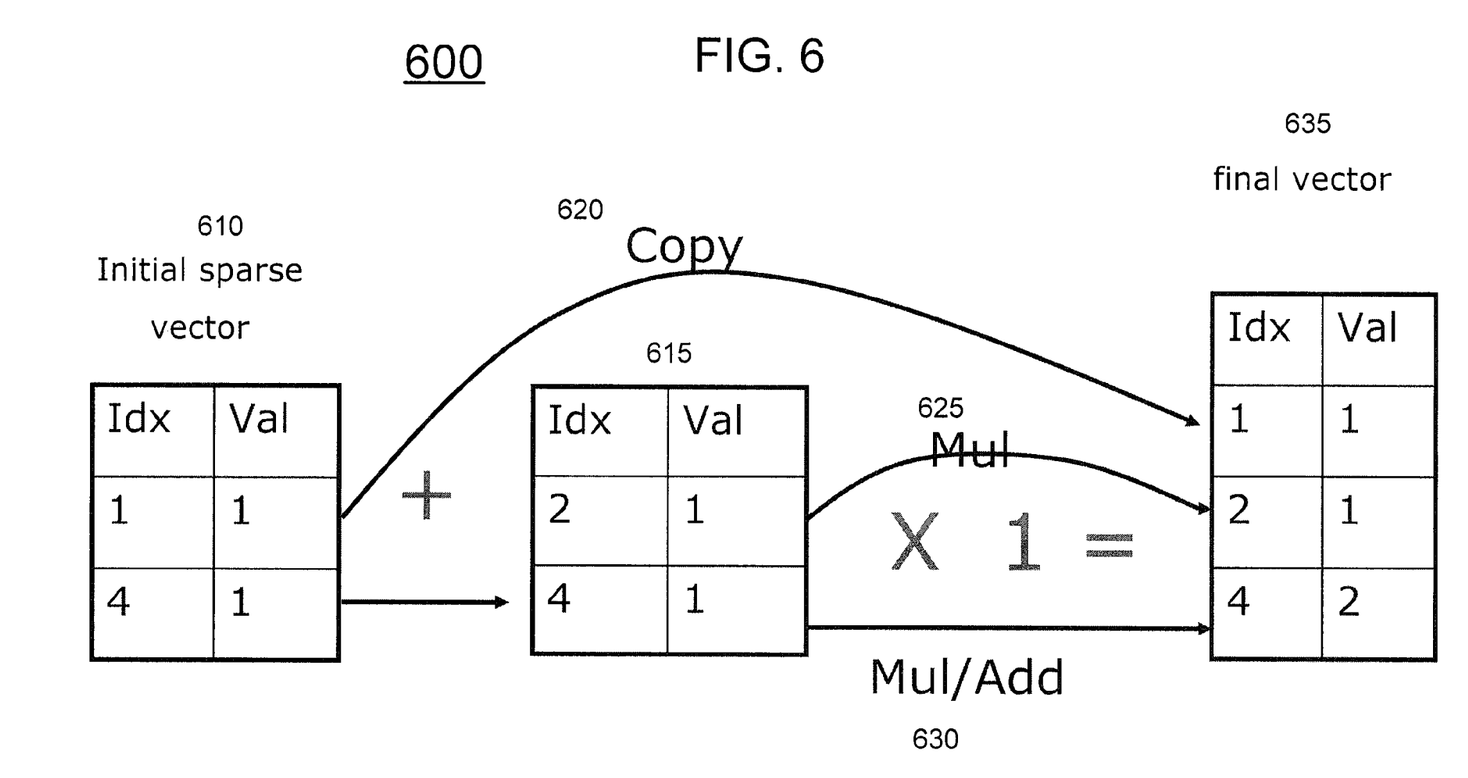
FIG. 6 illustrates a sparse list merging example of the present invention.

To further illustrate the sparse list merging function 400 computation example using matrix, M, and training vector, X, shown in FIG. 1, FIG. 6 illustrates a sparse list merging example 600 using function 400 of the present invention. Note the X only contains features F1 and F4 with corresponding column 1 and column 4 in M. Note also that the non-zero entries in X all have values of one; hence, all non-zero weightings used in the dot-product computations are ones. In example 600, the initial sparse vector is simply the encoded vector of feature column 1 in M representing feature F1; therefore, the initial sparse vector representing feature F1 is encoded in (index, value) pair as shown in list 610. The fourth column of matrix M representing feature F4 is encoded using (index, value) pairs as shown in list 615.

In step 620, function 400 performs a copy operation of the first entry, of the initial sparse vector to produce a resulting value of 1 in index position 1 of the final result vector 635.

In step 625, function 400 performs a multiplication operation on the first entry of the (index, value) pair list 615 to produce a resulting value of 1 in index position 2 of the final result vector 635.

In step 630, function 400 performs a multiplication and add operation between the second entry of the initial sparse vector 610 and the corresponding (index, value) pair, the second entry, in list 615 to produce a resulting value of 2 in index position 3 of the final result vector 635. At this point, the final result vector computations are completed since both non-zero feature columns F1 and F4 have been merged.

Figure 7:
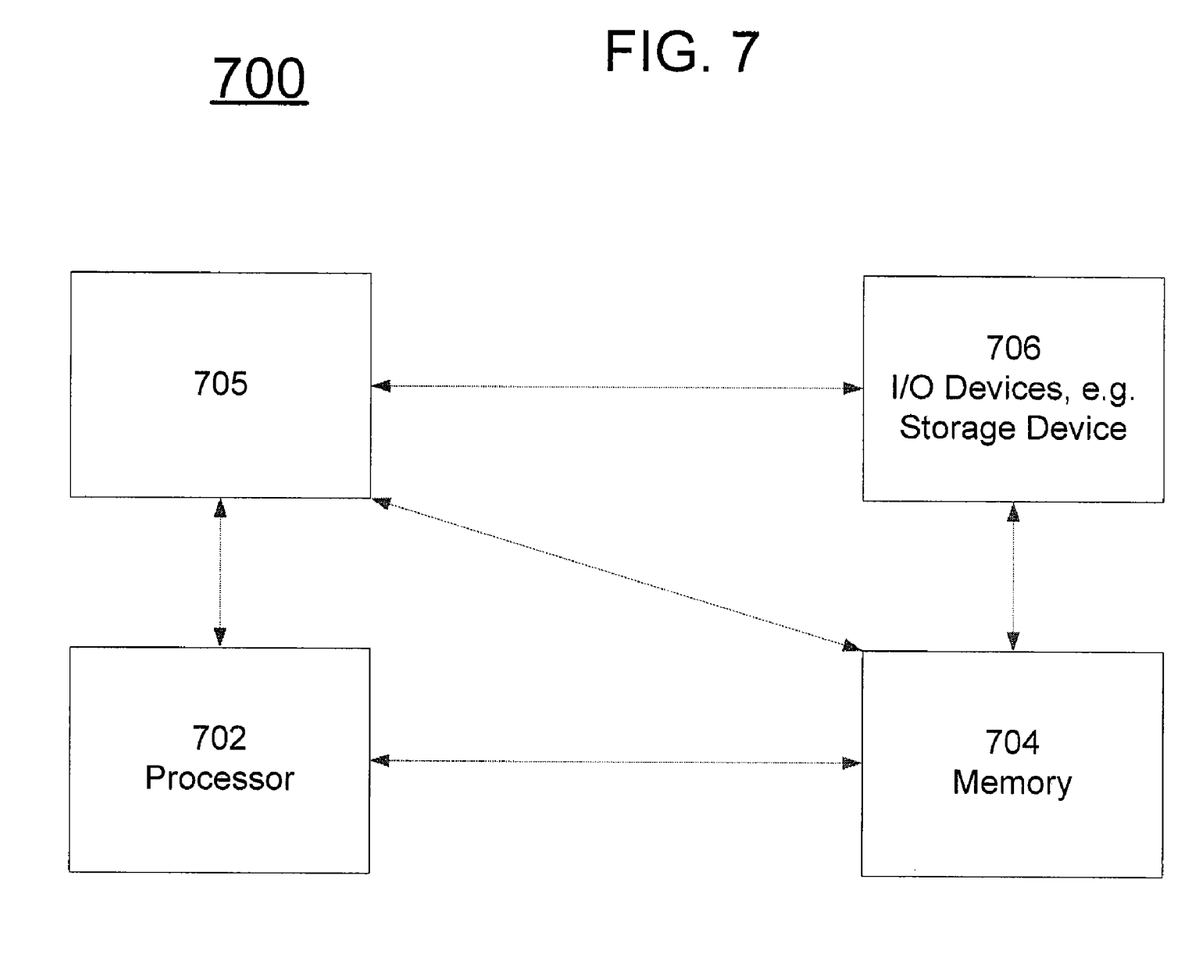
FIG. 7 illustrates a high level block diagram of a general purpose computer suitable for use in performing the functions described herein.

FIG. 7 depicts a high level block diagram of a general purpose computer suitable for use in performing the functions described herein. As depicted in FIG. 7, the system 700 comprises a processor element 702 (e.g., a CPU), a memory 704, e.g., random access memory (RAM) and/or read only memory (ROM), a module 705 for providing fast kernel learning on sparse data, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer, a Graphical Processing Unit (GPU) or any other hardware equivalents. In one embodiment, the present module or process 705 for providing fast kernel learning on sparse data can be loaded into memory 704 and executed by processor 702 to implement the functions as discussed above. As such, the present process 705 for providing fast kernel learning on sparse data (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling machine learning, comprising:
receiving a support vector comprising at least one feature represented by one non-zero entry;
identifying at least one column within a matrix with non-zero entries, wherein said at least one column is identified in accordance with said at least one feature of said support vector; and
performing, by a processor, kernel computations using successive list merging on said at least one identified column of said matrix and said support vector to derive a result vector, wherein said result vector is used in a data learning function, wherein said data learning function is applied to a machine learning application, wherein said performing comprises:

performing an iteration of merging of a first of said at least one identified column as an initial result vector and a next identified column vector to produce an updated result vector;

using said updated result vector as the initial result vector for a next iteration of merging until all identified columns have been processed; and wherein said merging comprises performing multiplication and addition computations between an entry of said initial result vector and an entry of said next identified column vector if said entry of said initial result vector comprises an index matching an index of said entry of said next identified column vector to produce a corresponding entry in the updated result vector.

2. The method of claim 1, wherein a position of said at least one identified column within said matrix corresponds to a same position of said at least one feature of said support vector.

3. The method of claim 1, wherein said kernel computations comprise dot-product computations.

4. The method of claim 1, wherein said at least one identified column of said matrix or said support vector is encoded as index-value pair only for non-zero value entries in a list format.

5. The method of claim 1, wherein said performing comprises:

performing a multiplication and addition computation between said at least one identified column of said matrix encoded as index-value pair only for non-zero value entries in said at least one identified column and said support vector.

6. The method of claim 5, wherein said performing comprises:

performing an iteration of multiplication and addition computations between each of said at least one identified column and said support vector to produce said result vector; and updating said result vector after each of said iteration of said multiplication and addition computations until all of said at least one identified column have been processed.

7. The method of claim 6, wherein said multiplication and addition computations are performed between each non-zero entry in said support vector and a corresponding index-value entry of said each of said at least one identified column with an index matching an index of said non-zero entry in said support vector.

8. The method of claim 6, wherein said updating comprises:

adding said result vector from a previous iteration of said multiplication and addition computations with said result vector from a current iteration of said multiplication and addition computations to produce said updated result vector.

9. The method of claim 6, wherein said updated result vector is encoded as an index-value pair only for non-zero value entries in a list format.

10. The method of claim 1, wherein said merging further comprises:

performing a copy operation of an entry of said initial result vector if an index of said entry of said initial result vector matches no entries of index of said next identified column vector to produce a corresponding entry in the updated result vector; and performing a multiplication operation of an entry of said next identified column vector if an index of said next identified column vector matches no entries of index of said initial result vector to produce a corresponding entry in the updated result vector.

11. A computer-readable storage medium having stored thereon a plurality of instructions, the plurality of instructions including instructions which, when executed by a processor, cause the processor to perform steps of a method for enabling machine learning, comprising:

receiving a support vector comprising at least one feature represented by one non-zero entry;

identifying at least one column within a matrix with non-zero entries, wherein said at least one column is identified in accordance with said at least one feature of said support vector; and performing kernel computations using successive list merging on said at least one identified column of said matrix and said support vector to derive a result vector, wherein said result vector is used in a data learning function, wherein said data learning function is applied to a machine learning application, wherein said performing comprises:

performing an iteration of merging of a first of said at least one identified column as an initial result vector and a next identified column vector to produce an updated result vector;

using said updated result vector as the initial result vector for a next iteration of merging until all identified columns have been processed; and wherein said merging comprises performing multiplication and addition computations between an entry of said initial result vector and an entry of said next identified column vector if said entry of said initial result vector comprises an index matching an index of said entry of said next identified column vector to produce a corresponding entry in the updated result vector.

12. The computer-readable storage medium of claim 11, wherein a position of said at least one identified column within said matrix corresponds to a same position of said at least one feature of said support vector.

13. The computer-readable storage medium of claim 11, wherein said kernel computations comprise dot-product computations.

14. The computer-readable storage medium of claim 11, wherein said at least one identified column of said matrix or said support vector is encoded as index-value pair only for non-zero value entries in a list format.

15. The computer-readable storage medium of claim 11, wherein said performing comprises:

performing a multiplication and addition computation between said at least one identified column of said matrix encoded as index-value pair only for non-zero value entries in said at least one identified column and said support vector.

16. An apparatus for enabling machine learning, comprising:

means for receiving a support vector comprising at least one feature represented by one non-zero entry;

means for identifying at least one column within a matrix with non-zero entries, wherein said at least one column is identified in accordance with said at least one feature of said support vector; and means for performing kernel computations using successive list merging on said at least one identified column of said matrix and said support vector to derive a result vector, wherein said result vector is used in a data learning function, wherein said data learning function is applied to a machine learning application;

wherein said performing comprises:

performing an iteration of merging of a first of said at least one identified column as an initial result vector and a next identified column vector to produce an updated result vector;

using said updated result vector as the initial result vector for a next iteration of merging until all identified columns have been processed; and wherein said merging comprises performing multiplication and addition computations between an entry of said initial result vector and an entry of said next identified column vector if said entry of said initial result vector comprises an index matching an index of said entry of said next identified column vector to produce a corresponding entry in the updated result vector.

* * * * *